US007630732B2

(12) United States Patent
Pan et al.

(10) Patent No.: US 7,630,732 B2
(45) Date of Patent: Dec. 8, 2009

(54) METHOD AND APPARATUS FOR GENERATING FEEDBACK INFORMATION FOR TRANSMIT POWER CONTROL IN A MULTIPLE-INPUT MULTIPLE-OUTPUT WIRELESS COMMUNICATION SYSTEM

(75) Inventors: Jung-Lin Pan, Selden, NY (US); Robert Lind Olesen, Huntington, NY (US); Yingming Tsai, Boonton, NJ (US)

(73) Assignee: InterDigital Technology Corporation, Wilmington, DE (US)

( * ) Notice: Subject to any disclaimer, the term of this patent is extended or adjusted under 35 U.S.C. 154(b) by 484 days.

(21) Appl. No.: 11/152,435

(22) Filed: Jun. 14, 2005

(65) Prior Publication Data

US 2006/0281421 A1 Dec. 14, 2006

(51) Int. Cl.
*H04B 7/00* (2006.01)

(52) U.S. Cl. ......................... 455/522; 455/69; 455/126; 455/245.1

(58) Field of Classification Search .................. 455/69, 455/522, 127.1, 127.5, 343.1–343.6, 245.1, 455/572–574
See application file for complete search history.

(56) References Cited

U.S. PATENT DOCUMENTS

| | | | | |
|---|---|---|---|---|
| 6,941,153 | B2 * | 9/2005 | Kim et al. | 455/522 |
| 7,068,981 | B2 * | 6/2006 | Sim | 455/101 |
| 7,113,808 | B2 * | 9/2006 | Hwang et al. | 455/562.1 |
| 7,236,748 | B2 * | 6/2007 | Li et al. | 455/69 |
| 7,242,727 | B2 * | 7/2007 | Liu et al. | 375/295 |
| 7,257,167 | B2 * | 8/2007 | Lau | 375/295 |
| 7,260,366 | B2 * | 8/2007 | Lee et al. | 455/102 |
| 7,280,840 | B2 * | 10/2007 | Murakami et al. | 455/522 |
| 7,289,770 | B2 * | 10/2007 | Li et al. | 455/69 |
| 7,424,273 | B2 | 9/2008 | Alexiou | |
| 7,444,161 | B2 * | 10/2008 | Cao et al. | 455/522 |
| 2002/0114269 | A1 | 8/2002 | Onggosanusi et al. | |
| 2002/0154705 | A1 | 10/2002 | Walton et al. | |
| 2002/0187753 | A1 * | 12/2002 | Kim et al. | 455/69 |
| 2003/0043732 | A1 | 3/2003 | Walton et al. | |
| 2003/0091103 | A1 | 5/2003 | Sendonaris | |
| 2003/0130003 | A1 * | 7/2003 | Won | 455/522 |
| 2003/0157954 | A1 * | 8/2003 | Medvedev et al. | 455/522 |

(Continued)

FOREIGN PATENT DOCUMENTS

| | | |
|---|---|---|
| EP | 1 207 645 | 5/2002 |

*Primary Examiner*—Lana N Le
*Assistant Examiner*—RuiMeng Hu
(74) *Attorney, Agent, or Firm*—Volpe and Koenig PC

(57) ABSTRACT

The present invention is related to a method and apparatus for generating feedback information for transmit power control in a multiple-input multiple-output (MIMO) wireless communication system. Both a transmitter and a receiver comprise multiple antennae for transmission and reception. The transmitter comprises a power allocation unit for controlling transmit power based on a feedback received from the receiver. The receiver comprises a channel estimator and a singular value decomposition (SVD) unit. The channel estimator generates a channel matrix from a signal received from the transmitter and the SVD unit decomposes the channel matrix into D, U and V matrices. The receiver sends a feedback generated based on output from the SVD unit to the transmitter. The feedback may be one of an eigenvalue, a transmit power level or a power control bit or command. A hybrid scheme for selecting one of them based on channel condition may be implemented.

19 Claims, 4 Drawing Sheets

U.S. PATENT DOCUMENTS

| | | | | |
|---|---|---|---|---|
| 2003/0186650 | A1* | 10/2003 | Liu | 455/25 |
| 2003/0235255 | A1 | 12/2003 | Ketchum et al. | |
| 2004/0033782 | A1* | 2/2004 | Horng et al. | 455/69 |
| 2004/0067739 | A1* | 4/2004 | Sim et al. | 455/101 |
| 2004/0082356 | A1* | 4/2004 | Walton et al. | 455/522 |
| 2004/0190643 | A1 | 9/2004 | Liu et al. | |
| 2004/0242162 | A1* | 12/2004 | Lau | 455/69 |
| 2005/0037718 | A1* | 2/2005 | Kim et al. | 455/101 |
| 2005/0130694 | A1* | 6/2005 | Medvedev et al. | 455/522 |
| 2005/0164645 | A1 | 7/2005 | Li et al. | |
| 2005/0245280 | A1* | 11/2005 | Liu et al. | 455/522 |
| 2006/0003710 | A1* | 1/2006 | Nakagawa et al. | 455/101 |
| 2006/0068718 | A1* | 3/2006 | Li et al. | 455/69 |
| 2006/0094373 | A1* | 5/2006 | Hottinen | 455/73 |
| 2006/0098760 | A1* | 5/2006 | Shen et al. | 375/299 |
| 2006/0205357 | A1* | 9/2006 | Kim | 455/69 |
| 2006/0234750 | A1* | 10/2006 | Horng et al. | 455/522 |
| 2006/0234751 | A1* | 10/2006 | Horng et al. | 455/522 |
| 2006/0276215 | A1* | 12/2006 | Lozano et al. | 455/522 |
| 2006/0276217 | A1* | 12/2006 | Khojastepour et al. | 455/522 |
| 2006/0281422 | A1* | 12/2006 | Pan et al. | 455/127.1 |
| 2007/0243831 | A1* | 10/2007 | Seki | 455/69 |

* cited by examiner

METHOD AND APPARATUS FOR GENERATING FEEDBACK INFORMATION FOR TRANSMIT POWER CONTROL IN A MULTIPLE-INPUT MULTIPLE-OUTPUT WIRELESS COMMUNICATION SYSTEM

FIELD OF INVENTION

The present invention is related to a wireless communication system. More particularly, the present invention is related to a method and apparatus for generating feedback information for transmit power control in a multiple-input multiple-output (MIMO) wireless communication system.

BACKGROUND

A MIMO communication system employs multiple transmit antennas and receive antennas for transmission and reception. Generally, capacity and performance are improved as the number of transmit and receive antenna increases. With multiple antennas, multiple channels are established between the transmitter and the receiver.

Generally, a transmitter is in restriction on transmit power and therefore should implement transmit power control. The transmitter allocates transmit power within the allowable maximum transmit power limit. Each channel of the MIMO system experiences different channel conditions. For example, multipath and fading conditions may vary on each channel.

Some systems use single carrier with frequency domain equalization (SC-FDE) at a receiver which uses no feedback. Therefore, these systems suffer poor system throughput and capacity. Other systems use slow feedback systems.

SUMMARY

The present invention is related to a method and apparatus for generating feedback information for transmit power control in a MIMO wireless communication system. Both a transmitter and a receiver comprise multiple antennae for transmission and reception. The transmitter comprises a power allocation unit for controlling transmit power based on a feedback received from the receiver. The receiver comprises a channel estimator and a singular value decomposition (SVD) unit. The channel estimator generates a channel matrix from a signal received from the transmitter and the SVD unit decomposes the channel matrix into D, U and V matrices. The receiver sends a feedback generated based on output from the SVD unit to the transmitter for controlling the transmit power. The feedback may be one of an eigenvalue, a transmit power level or a power control bit or command. A hybrid scheme for selecting one of them based on a channel condition may be implemented.

DETAILED DESCRIPTION OF THE PREFERRED EMBODIMENTS

The features of the present invention may be incorporated into an integrated circuit (IC) or be configured in a circuit comprising a multitude of interconnecting components.

Hereafter, a wireless transmit/receive unit (WTRU) includes but is not limited to a user equipment, mobile station, fixed or mobile subscriber unit, pager, or any other type of device capable of operating in a wireless environment. When referred to hereafter, a base station includes but is not limited to a Node-B, site controller, access point or any other type of interfacing device in a wireless environment. The transmitter or receiver features of the following embodiments can be utilized in a WTRU, base station or both.

Fast feedback and transmit power optimization for high data rate high speed MIMO system is provided. Three main embodiments for power allocation and control are provided. The first uses space-domain power allocation and control; the second uses joint space-frequency domain power allocation and control; and the third uses frequency domain power allocation and control.

Figure 1:
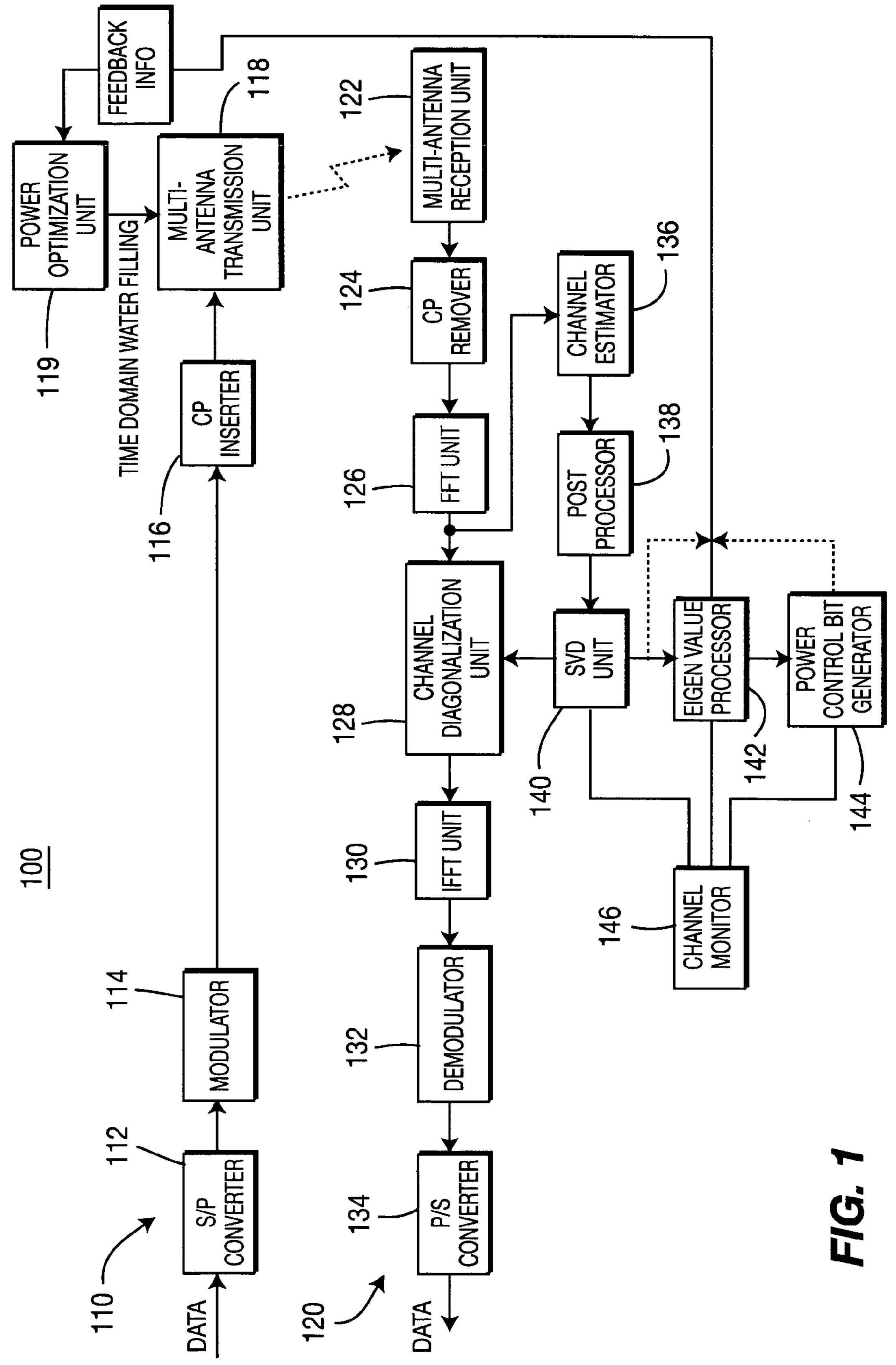
FIG. 1 is a block diagram of a system including a receiver for generating feedback information for transmit power control in accordance with one embodiment.

FIG. 1 is a block diagram of a system 100 for transmit power control in antenna domain. The system 100 comprises a transmitter 110 and a receiver 120. The transmitter 110 comprises a serial-to-parallel (S/P) converter 112, a modulator 114, a cyclic prefix (CP) inserter 116, multi-antenna transmission unit 118 and a power optimization unit 119. Input data is converted to a plurality of parallel data streams by the S/P converter 112 and the data streams are modulated by the modulator 114. The modulator 114 can use any kind of modulation techniques such as QPSK, QAM or other types of modulation techniques. A CP is then inserted into the data streams by the CP inserter 116 for preventing interblock interference. The data streams are then forwarded to the multi-antenna transmission unit 118 for transmission while the power optimization unit 119 scales transmit power for each antenna within the maximum allowable transmit power limit.

The total allowable transmit power is $P_T$. In accordance with this embodiment, the total transmit power is uniformly distributed across subfrequencies but water filled across antennas. Assuming that there are M antennas and Q subfrequencies, each subfrequency is allocated by power $P_T/Q$. For each subfrequency j, the antenna i is allocated by power $p_i^{(j)}$. For M transmit antennas, the power $p_i^{(j)}$ is computed by:

$$p_i^{(j)} = \max\left(Z - \frac{\sigma^2}{\lambda_i^{(j)}}, 0\right); \qquad \text{Equation (1)}$$

where $\lambda_i^{(j)}$ are the eigenvalues and Z is computed by:

$$\sum_{i=1}^{M} p_i^{(j)} = \frac{P_T}{Q}. \qquad \text{Equation (2)}$$

The total power constraint should be satisfied such that $$\sum_{j=1}^{Q} \sum_{i=1}^{M} p_i^{(j)} = P_T. \qquad \text{Equation (3)}$$

The power that is allocated to antenna i should be the sum of all the power of all subfrequencies that are allocated to antenna i as follows:

$$p_i = \sum_{j=1}^{Q} p_i^{(j)}. \quad \text{Equation (4)}$$

The total power constraint is also satisfied such that $$\sum_{i=1}^{M} p_i = P_T. \quad \text{Equation (5)}$$

The receiver 120 comprises multi-antenna reception unit 122, a CP remover 124, an FFT unit 126, a channel diagonalizer 128, an IFFT unit 130, a demodulator 132, a parallel-to-serial (P/S) converter 134, a channel estimator 136, a post processor 138 and a singular value decomposition (SVD) unit 140. Transmitted data is received by the multi-antenna reception unit 122. The CP is removed from the received data stream by the CP remover 124. The data stream is then forwarded to the FFT unit 126. The FFT unit 126 converts the data stream into a frequency domain. The output from the FFT unit is forwarded into the channel diagonalizer 128 and the channel estimator 136. The channel estimator 136 generates CSI, (i.e., a channel matrix H between each transmit antenna and each receive antenna). The channel estimator 136 generates the channel matrix by estimating the channel impulse responses either in frequency domain or generates it in time domain and then converts it to frequency domain. The channel matrix H is forwarded to the SVD unit 140, optionally via the post processor 138 for filtering.

The SVD unit 140 decomposes the channel matrix H into diagonal matrix D and the unitary matrix U and V such that:

$$H=UDV^H; \quad \text{equation (6)}$$

where U and V are the unitary matrix composed of eigenvectors of the matrix $HH^H$ and $H^HH$, respectively and $U^HU=V^HV=I$. D is diagonal matrix composed of the square root of eigenvalues of $HH^H$. Although SVD is provided as a preferable embodiment, eigenvalue decomposition or other similar techniques may be implemented instead of SVD.

The decomposed D, U and V matrices are sent to the channel diagonalizer 328. The channel diagonalizer 128 diagonalizes the received signals so that the interferences between antennas are eliminated. Suppose R, S denotes the frequency domain received signals and data respectively. The received signal model in frequency domain can be expressed by:

$$\vec{R}=H\vec{S}+\vec{N}. \quad \text{equation (7)}$$

The channel diagonalizer 128 diagonalizes the channel matrix H by applying the matrix $U^H$ and $D^{-1}V$ to the frequency domain received signal R. The resulting signal after diagonalization $\vec{R}_D$ becomes:

$$\vec{R}_D=D^{-1}VU^H\vec{R}=\vec{S}+D^{-1}VU^H\vec{N}. \quad \text{Equation (8)}$$

which is a frequency domain data plus noise.

To recover the time domain data s, IFFT is performed by the IFFT unit 130 on frequency domain data S, $\vec{S}$=FFT($\vec{s}$), such that $\vec{s}$=IFFT($\vec{S}$). The data is then processed by the demodulator 132 and the P/S converter 134.

In the present invention, four options are provided for feedback of transmit power control information to the transmitter 110. First, the eigenvalue obtained by the SVD unit 140 may be sent back to the transmitter 110 as a feedback for adjusting transmit power. Second, transmit power level may be computed from the eigenvalue and sent back to the transmitter 110 as feedback information. Third, a power control bit, (or power control command), may be generated and sent back to the transmitter 110 as feedback information. Fourth, a hybrid method may be implemented to combine the foregoing three options.

The first option is to send the eigenvalue to the transmitter 110. The feedback information containing the eigenvalues $\lambda_i^{(j)}$ is sent to the transmitter 110 for implementing power allocation and water filling. Assuming M transmit antennas and Q subfrequencies, the size of feedback information using the first option is MQ real numbers per feedback.

The second option is that the receiver 120 further comprises an eigenvalue processor 142 for processing the eigenvalue obtained from the SVD unit 140 and computing the optimum transmit power level, and the computed transmit power level is sent back to the transmitter 110 as a feedback.

The feedback information containing the power level of each antenna and/or each subfrequency component is sent to the transmitter 110 for implementing power allocation and water filling. Depending on the system, the size of feedback information varies. For space-domain water filling, the feedback information containing power level of each antenna is sent back to the transmitter 110. For frequency-domain water filling, the feedback information containing power level of each subfrequency component is sent back to the transmitter 110. For joint space-frequency domain water filling, the feedback information containing power level of each antenna and each subfrequency component is sent back to the transmitter 110. The size of feedback information is M, Q and MQ real numbers for space-domain, frequency-domain and joint space-frequency domain power allocation and water filling.

In options 1 and 2, the feedback information is significantly reduced compared to feedback information of channel impulse responses or CSI. In such systems, 2MNL real numbers of time domain coefficients or 2MNQ real numbers of frequency domain coefficients are required for feedback. L is length of delay spread.

As a third option, the receiver 120 may further comprise a power control bit generator 144 for generating a power control bit, (or power control command), from the transmit power level computed by the eigenvalue processor 142. The feedback information containing the power control bit, $PCB_i^{(j)}$, is sent to the transmitter 110 for implementing power allocation and water filling. The $PCB_i^{(j)}$ may be generated based on the following algorithms:

3-Step Algorithm (2 Bits):

$PCB_i^{(j)}$=00, if power level needs an increase for antenna i and subfrequency j 11, if power level needs a decrease for antenna i and subfrequency j Otherwise, if power level needs no increase or decrease 3-Step Algorithm with Silence (1 Bit):

$PCB_i^{(j)}$=0, if power level needs an increase for antenna i and subfrequency j 1, if power level needs a decrease for antenna i and subfrequency j Silence (no $PCB_i^{(j)}$ is sent), if power level needs no increase or decrease.

2-Step Algorithm (1 Bit):

$PCB_i^{(j)}$=0, if power level needs an increase for antenna i and subfrequency j 1, if power level needs a decrease for antenna i and subfrequency j For space-domain water filling, the feedback information containing $PCB_i$, i=1,2, . . . , M are sent back to the transmitter 110. For frequency-domain water filling, the feedback information containing $PCB^{(j)}$, j=1,2, . . . , Q are sent back to the transmitter 110. For joint space-frequency domain water filling, the feedback information containing $PCB_i^{(j)}$, i=1,2, . . . , M and j=1,2, . . . , Q are sent back to the transmitter 110. The size of feedback information of PCB is 2M, 2 Q and 2 MQ bits for space-domain, frequency-domain and joint space-frequency domain water filling for 3-step power control algorithm. The size of feedback information of PCB is M, Q and MQ bits for space-domain, frequency-domain and joint space-frequency domain water filling for 3-step power control with silence or 2-step power control algorithm. The third option using PCB is the fastest way among the above three options in terms of reduced feedback size and speed of transmit power control at the transmitter 110.

As a fourth option, the receiver 120 may further comprise a channel state monitor 146 for monitoring a channel condition and/or vehicle speed and for selecting appropriate form of feedback. The receiver 110 includes the SVD unit 140, the eigenvalue processor 142 and/or the power control bit generator 144, and one of the feedbacks is selected by the channel state monitor 146. Based on the measured channel conditions or vehicle speed the options 1, 2, or 3 are selected.

In a fast fading condition or high speed environment when the power level needs a jump, option 1, option 2 or option 3 with a large step size can be used. In a slow fading condition or low speed or static environment when power level is in a more stable condition, the option 3 with a small step size may be used. Variable or adaptive step sizes for option 3 can be applied for different channel conditions or vehicle speeds.

Figure 2:
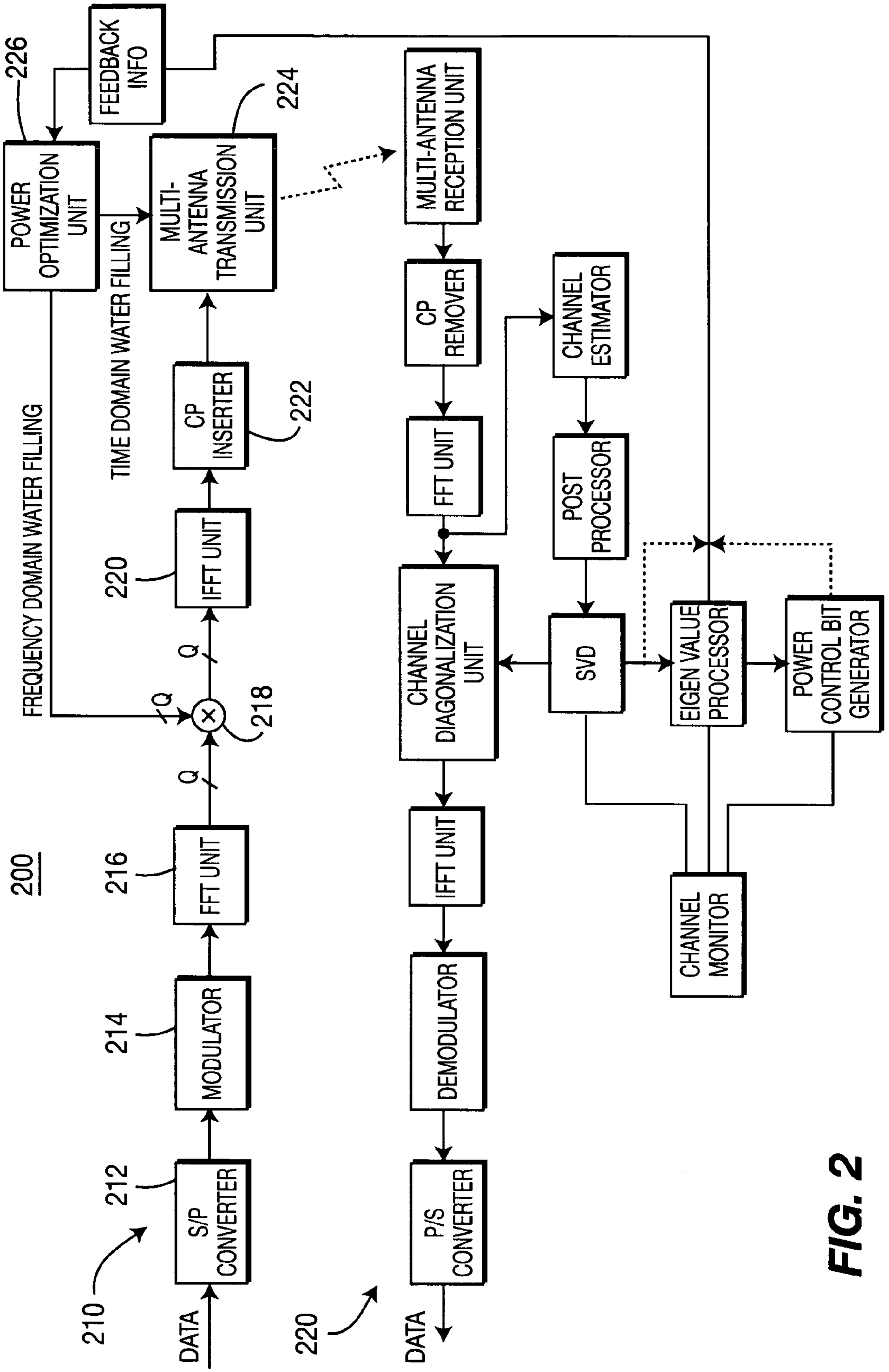
FIG. 2 is a block diagram of a system including a receiver for generating feedback information for transmit power control in accordance with another embodiment.

FIG. 2 is a block diagram of a system 200 for generating a feedback information for power control in accordance with another embodiment. The system 200 comprises a transmitter 210 and a receiver 220. The receiver 220 in FIG. 2 is basically same to the receiver 120 of FIG. 1. Therefore, the receiver 220 in FIG. 2 will not be explained again for simplicity and only the transmitter 210 will be explained hereinafter.

The transmitter 210 comprises a S/P converter 212, a modulator 214, a fast Fourier transform (FFT) unit 216, a mixer 218, an inverse FFT (IFFT) unit 220, a CP inserter 222, multi-antenna transmission unit 224 and a power optimization unit 226. Input data is converted to a plurality of parallel data streams by the S/P converter 212 and the data streams are modulated by the modulator 214. The modulated data streams are converted to frequency domain signals containing Q subfrequency components by the FFT unit 216.

In this embodiment, the power allocation and water filling is performed in joint space-frequency domain. The power is not uniformly distributed across frequencies or antenna, but optimized for each subfrequency and antenna. Transmit power level of each Q subfrequency component is scaled by the mixer 218 in accordance with control signals from the power optimization unit 226. Then, the frequency domain data is converted back to time domain signals by the IFFT unit 220. CP is then inserted into the data streams by the CP inserter 222 for preventing interblock interference. The power optimization unit 226 scales transmit power for each antenna within the maximum allowable transmit power limit. The data streams are then forwarded to the multi-antenna transmission unit 224 for transmission. Transmit power is adjusted both in antenna domain and frequency domain.

Alternatively, the power allocation and water filling may be performed in frequency domain only by turning off the antenna domain transmit power control. In this case the power is uniformly distributed across antenna but optimized for each subfrequency component. In this embodiment, the power allocated to each antenna is $P_T/M$. The total power constraint for transmission should be satisfied such that $$\sum_{j=1}^{Q} p_i^{(j)} = \frac{P_T}{M}. \qquad \text{Equation (9)}$$

Figure 3:
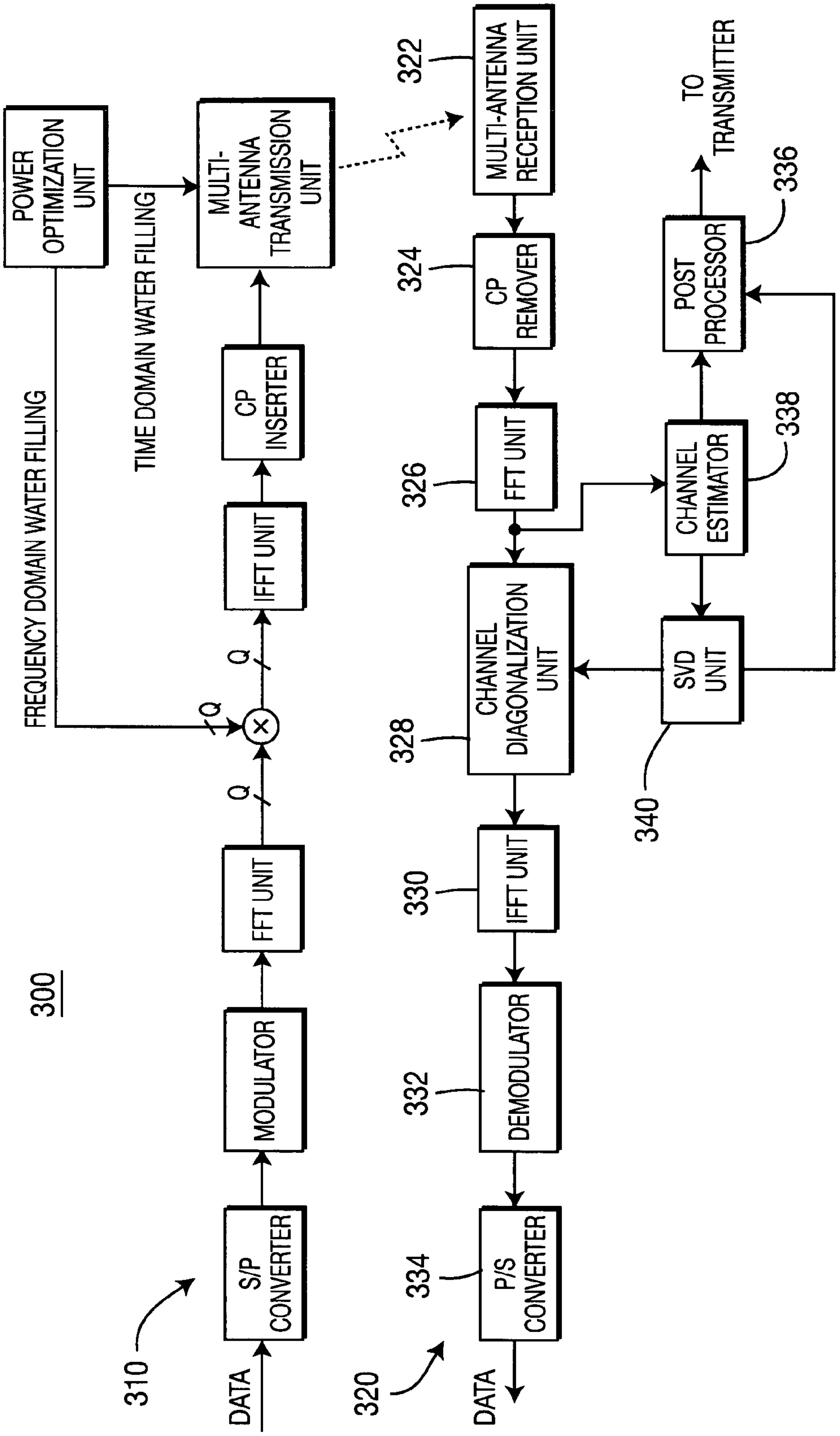
FIG. 3 is a block diagram of a system including a receiver for generating feedback information for transmit power control in accordance with yet another embodiment.

FIG. 3 is a block diagram of a system 300 in accordance with yet another embodiment of the present invention. The system 300 comprises a transmitter 310 and a receiver 320. The transmitter 310 in FIG. 3 is basically same to the transmitter 210 of FIG. 2. Therefore, the transmitter 310 in FIG. 3 will not be explained again for simplicity and only the receiver 320 will be explained hereinafter.

The receiver 320 comprises multi-antenna reception unit 322, a CP remover 324, an FFT unit 326, a channel diagonalizer 328, an IFFT unit 330, a demodulator 332, a parallel-to-serial (P/S) converter 334, a channel estimator 336, a post processor 338 and a singular value decomposition (SVD) unit 340. Transmitted data is received by the multi-antenna reception unit 322. The CP is removed from the received data stream by the CP remover 324. The data stream is then forwarded to the FFT unit 326. The FFT unit 326 converts the data stream into a frequency domain. The output from the FFT unit 326 is forwarded into the channel diagonalizer 328 and the channel estimator 336. The channel estimator 336 generates CSI, (i.e., a channel matrix H between each transmit antenna and each receive antenna). The channel matrix is forwarded to the SVD unit 340 and the post processor 338.

The SVD unit 340 decomposes the channel matrix into D, U and V matrices and the D, U and V matrices are forwarded to the channel diagonalizer 328 and the post processor 338. The post processor 338 filters the CSI generated by the channel estimator 336 and sends a feedback to the transmitter 310. The feedback may be a raw CSI, (i.e., a CSI without being post processed), or may be a post processed CSI. The feedback may be also one of an eigenvalue, a transmit power level or a power control bit for more efficient feedback.

The channel diagonalizer 328 diagonalizes the received signals so that the interferences between antennas are eliminated. To recover the time domain data, IFFT is performed on frequency domain data by the IFFT unit 330. The data is then processed by the demodulator 332 and the P/S converter 334.

Figure 4:
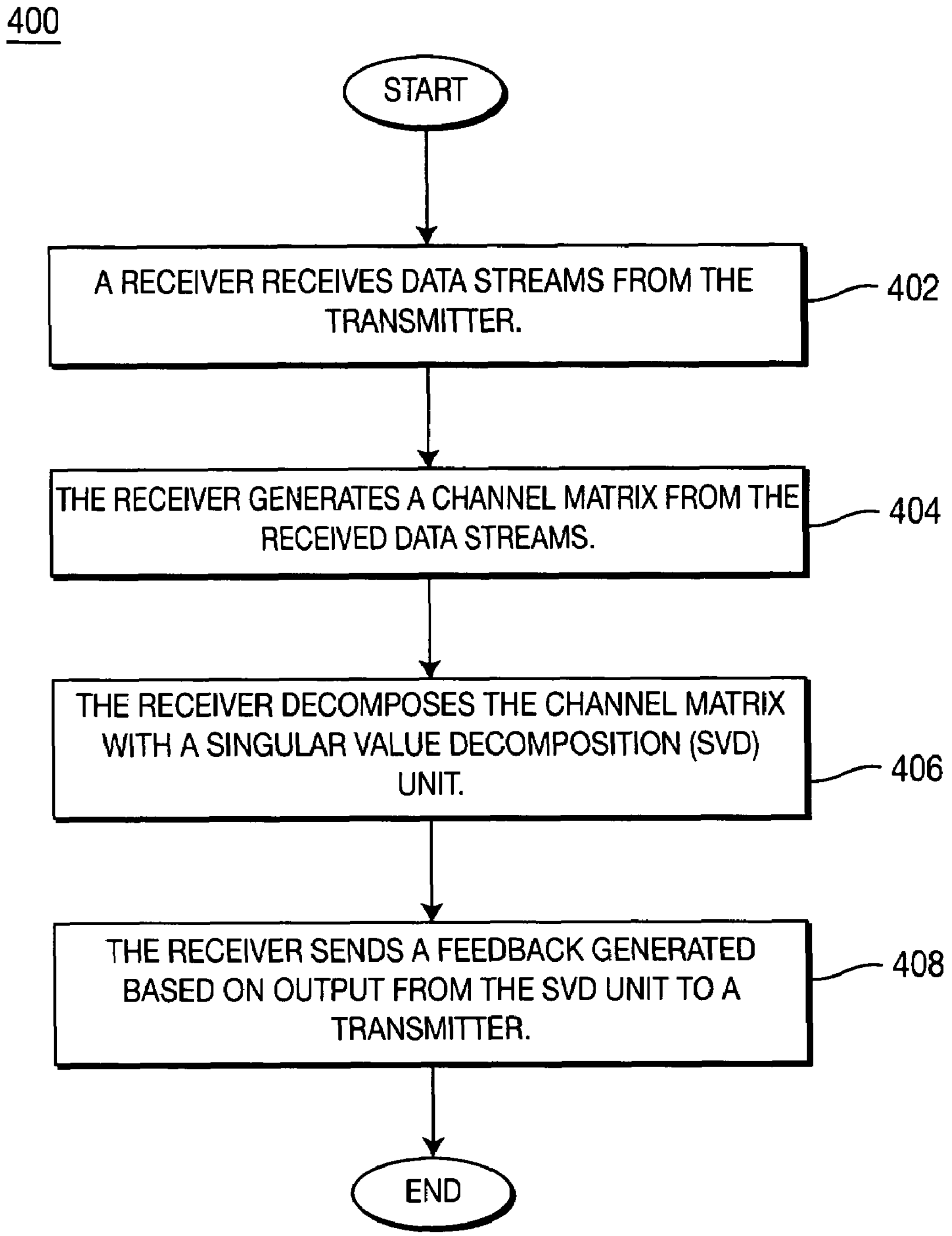
FIG. 4 is a flow diagram of a process for generating feedback information for transmit power control.

FIG. 4 is a flow diagram of a process 400 for generating a feedback information for transmit power control in a MIMO wireless communication system in accordance with the present invention. Both a transmitter and a receiver comprise a plurality of antennae for transmission and reception. A receiver receives data streams transmitted with multiple transmit antennae from a transmitter (step 402). The receiver generates a channel matrix H between multiple transmit antennae and multiple receive antennae from the received data streams (step 404). The receiver then decomposes the channel matrix H into diagonal matrix D and the unitary matrix U and V with a singular value decomposition (SVD) unit as shown in Equation (6) (step 406). The receiver sends feedback information generated based on output from the SVD unit to the transmitter (step 408). The transmitter then adjusts transmit power in accordance with the feedback.

Although the features and elements of the present invention are described in the preferred embodiments in particular combinations, each feature or element can be used alone without the other features and elements of the preferred embodiments or in various combinations with or without other features and elements of the present invention.

What is claimed is:

1. A receiver for generating feedback for transmit power control, the receiver comprising:

a channel estimator configured to generate a channel response matrix from a received signal;

a channel matrix decomposition unit configured to decompose the channel response matrix to calculate eigenvalues associated with each of multiple-input multiple-output (MIMO) channels;

an eigenvalue processor configured to calculate a transmit power level for each of the MIMO channels from the respective eigenvalues;

a power control bit generator configured to generate a power control bit for each of the MIMO channels from the respective transmit power levels; and a channel condition monitor configured to monitor channel condition and to dynamically switch a type of feedback dependent on the channel condition, the feedback type being one of the eigenvalues, the transmit power levels and the power control bits, wherein a different feedback type is selected as the channel condition changes.

2. The receiver of claim 1 wherein the channel matrix decomposition unit is configured to perform decomposition by eigenvalue decomposition.

3. The receiver of claim 1 wherein the channel matrix decomposition unit is configured to perform decomposition by a singular value decomposition (SVD) unit.

4. The receiver of claim 1 wherein the eigenvalue processor is configured to calculate transmit power level for each subfrequency component.

5. The receiver of claim 1 wherein the eigenvalue processor is configured to calculate transmit power level for each antenna and subfrequency component.

6. The receiver of claim 1 wherein the power control bit generator configured to generate power control bits in one of a 3-step mode, a 3-step with silence mode and a 2-step mode.

7. The receiver of claim 6 wherein the channel condition monitor is configured to dynamically switch to power control bit feedback with a 3-step with silence mode when the channel is fast fading, and power control bit feedback with a 2-step mode when the channel is slow fading.

8. A wireless transmit receive unit (WTRU) including the receiver of claim 1.

9. A base station including the receiver of claim 1.

10. A method for generating feedback for transmit power control, the method comprising:

receiving a signal;

generating a channel matrix from the received signal;

decomposing the channel matrix to calculate eigenvalues associated with each of multiple-input multiple-output (MIMO) channels;

calculating a transmit power levels for each of the MIMO channels from respective eigenvalues;

generating a power control bit for each of the MIMO channels from respective transmit power levels;

monitoring a channel condition; and generating feedback, a type of the feedback being dynamically switched dependent on the channel condition, the feedback type being one of the eigenvalues, the transmit power levels and the power control bits, wherein a different feedback type is selected as the channel condition changes.

11. The method of claim 10 wherein the channel matrix decomposition is performed by eigenvalue decomposition.

12. The method of claim 10 wherein the channel matrix decomposition is performed by a singular value decomposition (SVD) unit.

13. The method of claim 10 wherein the transmit power level is calculated for each subfrequency component.

14. The method of claim 10 wherein the transmit power level is calculated for each antenna and subfrequency component.

15. The method of claim 10 wherein the power control bit is generated in one of a 3-step mode, a 3-step with silence mode and a 2-step mode.

16. The method of claim 15 wherein the power control bits with a 3-step with silence mode is selectable as feedback when the channel is fast fading, and the power control bits with a 2-step mode is selectable as feedback when the channel is slow fading.

17. The method of claim 10 wherein a transmit power is optimized for each antenna independently while the transmit power is evenly distributed to subfrequency components.

18. The method of claim 10 wherein a transmit power is optimized for each subfrequency component independently while the transmit power is evenly distributed to antennas.

19. The method of claim 10 wherein a transmit power is optimized for both subfrequency components and antennas, jointly.

* * * * *

UNITED STATES PATENT AND TRADEMARK OFFICE

CERTIFICATE OF CORRECTION

PATENT NO. : 7,630,732 B2
APPLICATION NO. : 11/152435
DATED : December 8, 2009
INVENTOR(S) : Pan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 534 days.

Signed and Sealed this

Second Day of November, 2010

David J. Kappos

*Director of the United States Patent and Trademark Office*